(12) United States Patent
Soriano

(10) Patent No.: US 10,387,082 B2
(45) Date of Patent: Aug. 20, 2019

(54) PRINTING MACHINE AND METHOD FOR TRAY SELECTION IN PRINTING

(71) Applicant: KONICA MINOLTA LABORATORY U.S.A., INC., San Mateo, CA (US)

(72) Inventor: Randy Cruz Soriano, San Leandro, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 125 days.

(21) Appl. No.: 15/630,515

(22) Filed: Jun. 22, 2017

(65) Prior Publication Data

US 2018/0373469 A1 Dec. 27, 2018

(51) Int. Cl.
| | |
|---|---|
| *B65H 3/44* | (2006.01) |
| *B65H 7/02* | (2006.01) |
| *G06F 3/12* | (2006.01) |
| *G03G 15/00* | (2006.01) |
| *G03G 15/23* | (2006.01) |
| *G06K 15/00* | (2006.01) |
| *G06K 15/02* | (2006.01) |

(52) U.S. Cl.
CPC ............. *G06F 3/1204* (2013.01); *B65H 3/44* (2013.01); *B65H 7/02* (2013.01); *G03G 15/55* (2013.01); *G03G 15/6508* (2013.01); *G06K 15/1823* (2013.01); *G06K 15/4065* (2013.01); *B65H 2405/3321* (2013.01); *B65H 2511/52* (2013.01); *B65H 2513/42* (2013.01); *G03G 15/23* (2013.01)

(58) Field of Classification Search
CPC .. G06F 3/1204; G03G 15/6508; G03G 15/55; G03G 15/23; G06K 15/1823; G06K 15/4065; B65H 2511/52; B65H 2513/42; B65H 3/44; B65H 7/02; B65H 2405/3321
See application file for complete search history.

(56) References Cited

U.S. PATENT DOCUMENTS

| | | | | |
|---|---|---|---|---|
| 2011/0013924 A1* | 1/2011 | Hosoi | ................ | G03G 15/6508 399/83 |
| 2012/0194599 A1* | 8/2012 | Kido | ...................... | B41J 2/2146 347/19 |
| 2013/0100187 A1* | 4/2013 | Yasuzaki | .............. | B41J 2/16517 347/9 |
| 2017/0088377 A1* | 3/2017 | Sone | .................. | G03G 15/6508 |
| 2017/0088378 A1* | 3/2017 | Sone | .................. | G03G 15/6508 |

* cited by examiner

*Primary Examiner* — David H Banh
(74) *Attorney, Agent, or Firm* — Squire Patton Boggs (US) LLP

(57) ABSTRACT

Tray selection in printing may involve checking for the availability of paper trays which may provide increased paper throughput, and by postponing a switch to use such trays to help avoid excessive tray switching that could adversely affect paper throughput. When a higher ranked tray is unavailable, tray selection may involve checking the availability of lower ranked trays before the present tray is empty, and by postponing a switch to such trays to help avoid excessive tray switching. A change in printing condition may provide a convenient and opportune time to switch between trays without adversely affecting paper throughput.

20 Claims, 8 Drawing Sheets

PRINTING MACHINE AND METHOD FOR TRAY SELECTION IN PRINTING

FIELD

This disclosure relates generally to printing technology and, more particularly, to a printing machine and method for tray selection in printing.

BACKGROUND

A print job involves printing a sequence of pages, possibly with changes in paper type. Conventional print processes typically use a paper tray (e.g., a first tray) until it is empty, then the next available tray (e.g., a second tray) having the appropriate paper type is used until it is empty, and then the next available tray (e.g., a third tray) having the appropriate paper type is used until it is empty. The second tray is used until it is empty, even if the first tray is refilled with paper before the second tray is empty. Also, the third tray is used until it is empty, even if the first tray has been refilled. Such a process could result in lower throughput and longer print times, which may be significant in high-speed printing operations. This is because the time required for a sheet of paper to travel within a printing machine may vary based on the paper tray being used. For example, the travel distance for the first tray may be less than that for the second tray. A relatively small difference in time for a single sheet could multiply into substantial inefficiency and increased cost for business operations that are required to print as quickly as possible. Accordingly, there is a continuing need for a system and method for increasing printing efficiency.

SUMMARY

Briefly and in general terms, the present invention is directed to a method, printer, and non-transitory computer readable medium for printing that involves tray selection.

In aspects of the invention, a method comprises receiving a print job in a printing machine, and printing a page of the print job, wherein the printing includes performing a tray selection process for selecting a tray among a plurality of trays from which paper will be obtained for printing the page of the print job. The tray selection process comprises checking for a first condition in which a higher ranked tray, among the plurality of trays, contains a number of sheets above a first lower limit, the higher ranked tray ranked higher than a present tray among the plurality of trays, checking for a second condition corresponding to a change in printing condition occurring in the printing machine unrelated to the number of sheets contained in the higher ranked tray, and obtaining a sheet for printing the page, the sheet obtained from the higher ranked tray when the first and second conditions are satisfied, the sheet obtained from the present tray or other tray when any one or both of the first and second conditions are not satisfied, the other tray being among the plurality of trays and being ranked lower than the present tray.

In aspects of the invention, a printing machine comprises a plurality of trays, a printer processor, and a printing assembly. The plurality of trays comprises a first tray, a second tray, and a third tray. The printer processor is configured to analyze a print job received by the printing machine, and to perform a tray selection process for selecting a tray among the plurality of trays from which paper will be obtained for printing a page of the print job. The tray selection process comprises checking for a first condition in which a higher ranked tray, among the plurality of trays, contains a number of sheets above a first lower limit, the higher ranked tray ranked higher than a present tray among the plurality of trays, checking for a second condition corresponding to a change in printing condition occurring in the printing machine unrelated to the number of sheets contained in the higher ranked tray, and obtaining a sheet for printing the page, the sheet obtained from the higher ranked tray when the first and second conditions are satisfied, the sheet obtained from the present tray or other tray when any one or both of the first and second conditions are not satisfied, the other tray being among the plurality of trays and being ranked lower than the present tray. The printing assembly is configured to print an image on the obtained sheet.

In aspects of the invention, a non-transitory computer readable medium has a program stored therein for controlling a printing machine, the program causing a printer processor of the printing machine to execute a process for printing. The process comprises checking for a first condition in which a higher ranked tray, among the plurality of trays, contains a number of sheets above a first lower limit, the higher ranked tray ranked higher than a present tray among the plurality of trays, checking for a second condition corresponding to a change in printing condition occurring in the printing machine unrelated to the number of sheets contained in the higher ranked tray, and obtaining a sheet for printing the page, the sheet obtained from the higher ranked tray when the first and second conditions are satisfied, the sheet obtained from the present tray or other tray when any one or both of the first and second conditions are not satisfied, the other tray being among the plurality of trays and being ranked lower than the present tray.

The features and advantages of the invention will be more readily understood from the following detailed description which should be read in conjunction with the accompanying drawings.

DETAILED DESCRIPTION

Figure 1:
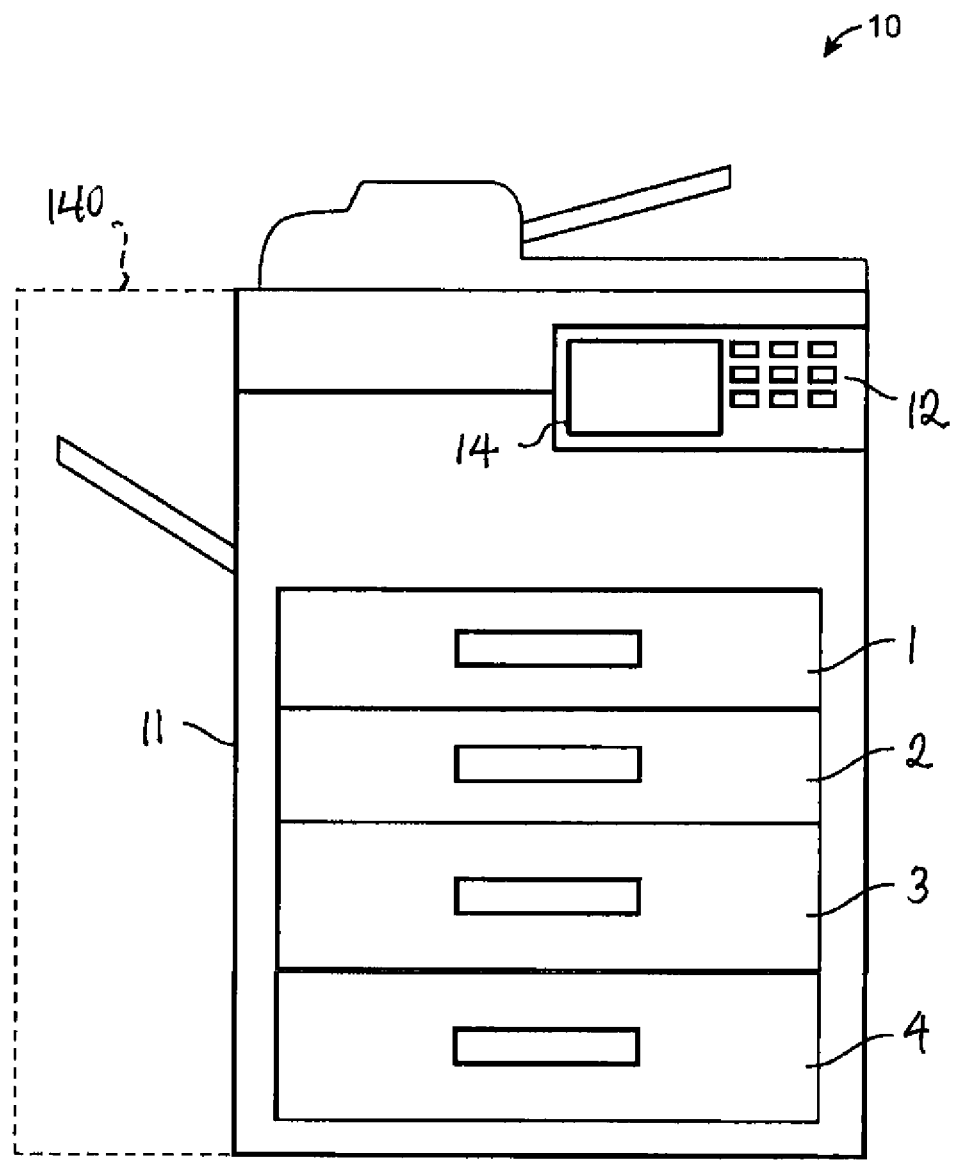
FIG. 1 is a schematic side view of an example printing machine.

As used herein, the term "paper" refers to any type of printable substrate on which an image may be applied. The term "paper" encompasses pulp paper made by pressing cellulose pulp fibers into flat sheets, plastic films and sheets (for example, transparency films and acetate sheets), and the like.

As used herein, the term "image" encompasses any one or a combination of photographs, pictures, illustrations, alphanumeric and linguistic characters, symbols, and other graphical representations.

The term "sheet" and the phrases "paper sheet" and "sheet of paper" have the same meaning are refer to a distinct piece of printable substrate. For example, a "paper sheet" could be a distinct piece of pulp paper, plastic sheet, or the like.

As used herein, the term "paper type" refers to the size and grammage of the printable substrate. Size can be specified in terms of US paper size, such as letter and legal size paper, or in terms of the international standards, such as A4, A3, and so on. Grammage refers generally to weight. Grammage may refer to density or weight per area, which can be expressed in terms of grams per square meter. Grammage may refer to weight per a known number of sheets, which can be expressed in terms pounds per 500 sheets, kilograms per 1000 sheets, and so on. Paper type may refer to the material from which the printable substrate is made, whether it is pulp or plastic.

The term "tray" and "paper tray" have the same meaning and refer to any type of container from which a printing machine may obtain paper of any type. For example, a "paper tray" could be a tray capable of holding a ream of paper, a large bin capable of holding multiple reams of paper, or a manual feed tray capable of holding a few sheets of paper.

The term "print job" relates to a set of printing instructions. For example, a user (person) may create a first print job that instructs a printing machine to make ten copies of a first document, a second print job that instructs the printing machine to make five copies of a second document, and a third print job that instructs the printing machine to make two copies of a third document. The printing instructions may be executed by the printing machine as a batch that comprises the first, second, and third print jobs. Each succeeding print job may have printing requirements that change from the preceding print job. Changes in printing requirements may occur from one job to the next. Changes in printing requirements may involve color versus black and white printing, one-versus two-sided printing, and paper type. Changes in printing requirements may also occur within a single print job. For example, a document may require more than one paper type, such as requiring A4 size for pages 1 to 10, A3 size for page 11, and A4 size for pages 12 to 20.

As used herein, "printing machine" encompasses a variety of machines capable of forming an image on a printable substrate. Examples of printing machines include, without limitation, copying machines wherein physical documents are optically scanned to capture images on the documents so that the images can be duplicated onto printable substrate; laser, inkjet, and other types of printing machines wherein image data of an electronic file, such as a file from a word processing, graphics or other type of computer program, is processed for printing onto printable substrate; and a multifunction peripheral (MFP) device having the combined functions of a copying machine and printing machine. A printing machine may have paper trays built into it and/or paper trays which may be attached and disconnected from it.

Referring now in more detail to the exemplary drawings for purposes of illustrating aspects of the invention, wherein like reference numerals designate corresponding or like elements among the several views, there is shown in FIG. 1 example printing machine 10 in the form of an MFP device.

It is to be understood that the invention may be embodied in or make use of a printing machine configured in ways other than what is illustrated.

Printing machine 10 is capable of receiving a print job, which can be one that was sent to printing machine 10 or can be one that is generated at printing machine 10 when a physical document is placed by a user on printing machine 10 for duplication. For example, a print job can be sent by a user to printing machine 10 from a data processing apparatus, such as a remote computer or remote scanner.

As shown in FIG. 1, printing machine 10 comprises user input panel 12, display screen 14, and a plurality of paper trays 1, 2, 3, 4 which can slide in and out of printing machine housing 11. The trays can hold stacks of different paper types. It is to be understood that numerical tray designations herein are arbitrary. Trays are designated tray 1, tray 2, tray 3, and tray 4 for ease of discussion and understanding. Although four trays are illustrated, printing machine 10 may have a lesser or greater number of trays. Also, the numerical designations do not necessarily relate to the labels used on printing machine 10, and they do not necessarily relate to the location of the tray. For example, tray 1 can be either the top tray, the middle tray, or the bottom tray. Also, trays are discussed below in terms of ranking, and it is to be understood that the numerical tray designations do not necessarily match the ranking. For example, tray 1 could be ranked higher than tray 2 for one paper type and ranked lower than tray 2 for another paper type.

Figure 2:
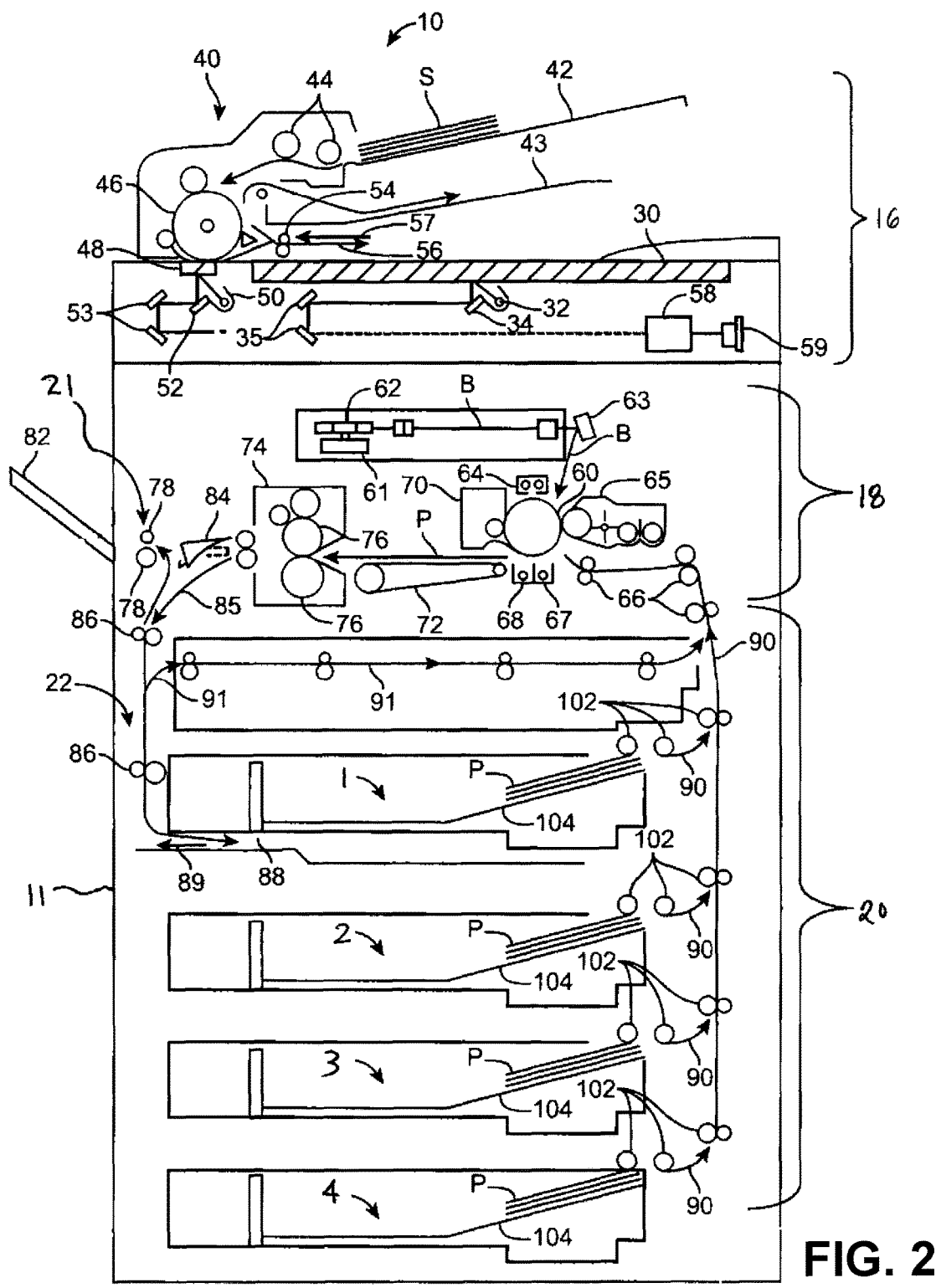
FIG. 2 is a schematic diagram showing the interior of the printing machine of FIG. 1.

As shown in FIG. 2, printing machine 10 further comprises image reading assembly 16, printing assembly 18, paper conveyance mechanisms 20, paper ejection assembly 21 (at the left side of the figure), and paper reversing assembly 22. These assemblies are described in turn below.

Image reading assembly 16 reads optical information of one or more images on document S. Document S is a physical document a user has placed on printing machine 10. Reading is performed by illuminating document S with light and converting the optical information into electrical or digital information. For example, document S may be placed on transparent platen 30 such that the image on document S faces down on platen 30. Optical scanning is performed as follows. Light source 32 projects light on the image-bearing surface of document S. The light arriving at the image-bearing surface of document S is reflected onto mirror 34. The light arriving at mirror 34 includes information about the image on document S. Light source 32 and mirror 34 are configured to move along platen 30, such as by a rail and motor, so that the entire image bearing surface of document S can be optically scanned while document S remains stationary on platen 30.

Document S can be a stack of sheets of paper. To handle a stack of sheets, printing machine 10 comprises sheet feeding assembly 40 which separates an individual sheet from the stack of sheets placed on sheet input stand 42. Adjacent to sheet input stand 42 are a series of rollers 44, 46 that pull an individual sheet from the stack of sheets and convey the individual sheet across slit glass 48. Unlike light source 32 and mirror 34, light source 50 and mirror 52 are fixed in position below the slit glass 48. This arrangement allows for continuous optical scanning of the image-bearing surfaces of the sheets as the sheets move one by one across slit glass 48. Each sheet is ejected to sheet ejection stand 43 after the sheet has been optically scanned.

Document S may also have images on both sides of the sheets, so printing machine 10 may be configured to optically scan both sides of each sheet if desired. The sheet is taken from sheet input stand 42 by rollers 44, 46, which convey the sheet to slit glass 48 where one side of the sheet is optically scanned by light source 50 and mirror 52. After one side has been completely scanned, the sheet is fed out by roller 54 in the direction of arrow 56. Before reaching the end of the sheet, roller 54 reverses direction so that the sheet travels in the direction of arrow 57 and is taken up by roller 46 in such a way that the other side of the sheet is passed across slit glass 48, so the other side of the sheet is optically scanned. Thereafter, the sheet is ejected to sheet ejection stand 43.

Figure 3:
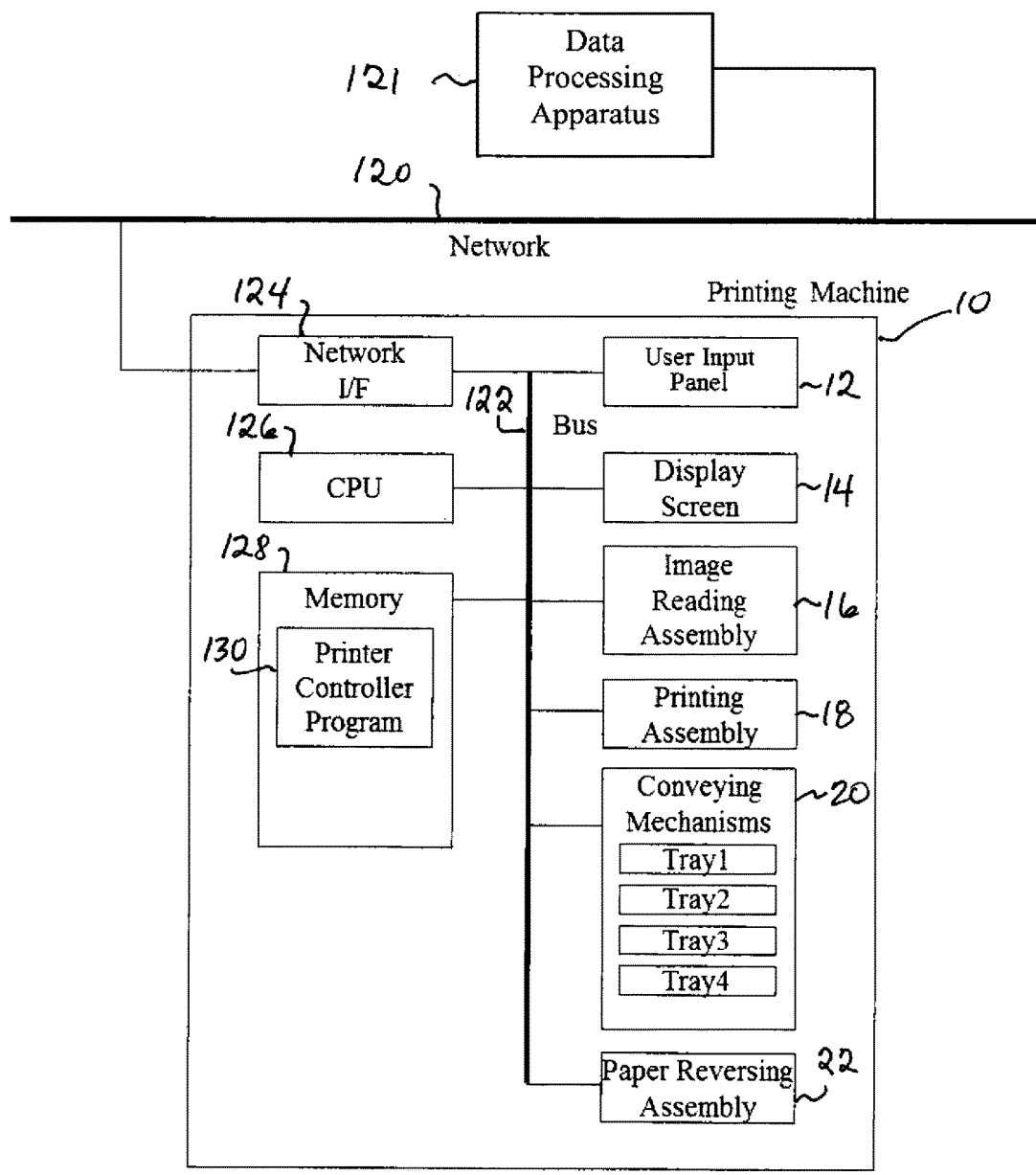
FIG. 3 is a schematic block diagram showing elements of the printing machine of FIG. 1.

Optical information obtained from light emitted from light sources 32 or 50 and reflected from the image-bearing surface of a sheet is captured by mirrors 34 or 52. The reflected light is guided by additional mirrors 35 or 53 through image forming optical system 58 to image pick-up device 59, which is configured to convert incoming photons to electrical information. The electrical information is processed by CPU 126 (FIG. 3) to form image data. Alternatively, image data for a print job could be sent to printing machine 10 by a data processing apparatus, such as a remote computer or a remote scanner, connected to printing machine 10 via network 120 (FIG. 3).

Printing assembly 18 generates electrostatic latent images based on image data obtained via a network connection or from image reading assembly 16. Printing assembly 18 comprises a laser emitter and various mirrors controlled by motors for guiding laser beam B to photoreceptor drum 60. The obtained image data are used to control the laser emitter and motor 61 which rotates polygon mirror 62. Laser beam B is reflected from polygon mirror 62 and another mirror 63 onto photoreceptor drum 60. Mirror 63 scans laser beam B along the axis of photoreceptor drum 60 to produce an electrostatic latent image on the drum surface that matches an image defined by the obtained image data.

Before the electrostatic latent image is formed on drum 60, the entire surface of drum 60 is uniformly charged by charging assembly 64. Next, the electrostatic charge on portions of the surface of drum 60 is neutralized by laser beam B which is scanned onto the surface of drum 60 according to the obtained image data. The neutralized areas of drum 60 form the electrostatic latent image.

Still referring to FIG. 2, printing assembly 18 uses the electrostatic latent image on photoreceptor drum 60 to form a matching toner image on paper P taken from one of trays 1, 2, 3, 4 using paper conveyance mechanisms 20. Paper conveyance mechanisms 20 includes rollers 102 that convey paper P from trays 1, 2, 3, 4 to photoreceptor drum 60. Each of trays 1, 2, 3, 4 includes floor 104 that raises paper P into contact with rollers 102.

Developing assembly 65 delivers charged toner particles to photoreceptor drum 60. The toner particles adhere only to the electrostatic latent image. That is, the toner particles adhere only to areas of the surface of drum 60 where laser beam B has neutralized the electrostatic charge previously applied by charging assembly 64. Printing assembly 18 also includes various rollers 66 that convey paper P to drum 60. The toner particles on drum 60 are transferred by transfer assembly 67 onto paper P. The toner particles adhere to paper P so that paper P now carries a toner image that matches the image defined by the obtained image data.

Separation assembly 68 separates paper P from photoreceptor drum 60. Separation assembly 68 may include a rotating roller that pulls paper P from drum 60. Next, cleaning assembly 70, which may include a flexible scraper blade, removes any residual toner on drum 60 to create a cleaned surface so that uniform charging of drum 60 by charging assembly 64 can be repeated.

After paper P is separated from photoreceptor drum 60, paper P is conveyed by looped belt 72 to fixing assembly 74. Belt 72 is rotated by a plurality of rollers. Fixing assembly 74 includes rollers 76 configured to apply pressure and heat to paper P. The pressure and heat fixes the toner image onto paper P. Thereafter, paper P is ejected by rollers 78 of ejection assembly 21 out of housing 11. Paper P is ejected onto output tray 82 attached to housing 11. Printing machine 10 has printed an image only on one side of paper P, so this is an example of one-sided printing.

Printing machine 10 is also capable of two-sided printing, also referred to as duplex printing, in which an image is printed on one side and then another image is printed on the opposite side of paper P. After the toner image is fixed on one side of paper P, paper P is conveyed to paper reversing assembly 22 which includes pivoting paper guide rail 84 that switches the paper path (conveying path of paper P) between the paper reversing assembly 22 and paper ejection assembly 21. When paper guide rail 84 is in a reversing position, paper P is conveyed downward as indicated by arrow 85, instead of be conveyed directly to output tray 82. Paper P is conveyed by rollers 86 to reversing area 88. After paper P has moved into reversing area 88 by a predetermined amount, rollers 86 rotate in the opposite direction to convey paper P in a reverse direction indicated by arrow 89. Paper P travels through reverse paper path 91 and arrives at the upstream side of drum 60 once again. This time, the opposite side of paper P faces drum 60 and is subjected to toner image transfer and fixing in the same manner previously described. Thereafter, paper P is conveyed to output tray 82, while another sheet of paper is obtained from a tray to print the next page of the print job. That is, a single sheet or piece is printed on one side and then the opposite side before the next sheet is printed. This is an example of piecewise duplex printing.

Printing machine 10 is also capable of groupwise duplex printing. A group of sheets (at least two sheets) are printed on one side, conveyed into reversing area 88, and then conveyed to the upstream side of drum 60 once again to have their opposite sides printed. Next, another group of sheets is obtained from the trays, printed on one side, conveyed into reversing area 88, and then conveyed to the upstream side of drum 60 once again to have their opposite sides printed. This method of duplex printing may increase efficiency by reducing the number of paper path changes in which various paper guide rails and rollers must change direction.

For example, groupwise duplex printing may be based on two sheets: sheet 1 and sheet 2. Sheet 1 is obtained from a tray, a first side of sheet 1 is printed while a second sheet is obtained from the tray, and then a first side of sheet 2 is printed. Both sheets of this group are conveyed into reversing area 88, and then a paper path change is performed. This allows for a changeover from first side printing to second side printing. Both sheets of the group are conveyed to the upstream side of drum 60 to allow printing on the second side of sheet 2 followed by printing on the second side of sheet 1. Sheet 2 and sheet 1 are sent to output tray 82 while the next group of two sheets is obtained from the tray. A paper path change is performed, which allows for a changeover from second side printing for the previous group to first side printing for the next group, and the process is repeated. Groupwise duplex printing can be based on any number of sheets, such as three or four. In larger printing machines, groupwise duplex printing can be based on at least five or at least ten sheets.

Referring now to FIG. 3, printing machine 10 may be connected to network 120 to allow communication with data processing apparatus 121, such as a remote computer or a remote scanner. Examples of a remote computer include, without limitation, a computer workstation, personal computer, laptop computer, tablet, smartphone, or other data processing apparatus. A remote scanner could be another printing machine having an image reading assembly. Such examples for data processing apparatus 121 include their own CPU, memory, and network interface (I/F) for communicating with network 120. Communication between printing machine 10 and data processing apparatus 121 through network 120 may be accomplished by any wired and/or wireless means known in the art. Network 120 may comprise any one or a combination of a local area network (LAN), wide area network (WAN), portions of the Internet, and telephone communication carriers. Network 120 can be used by a remote computer to send a print job to printing machine 10.

Various elements of printing machine 10 are interconnected by communication bus 122. The elements include network interface (I/F) 124, central processing unit (CPU) 126, memory 128, user input panel 12, display screen 14, image reading assembly 16, printing assembly 18, conveyance mechanisms 20, trays 1, 2, 3, 4, and paper reversing assembly 22.

Network I/F 124 includes circuitry configured to allow data transfer through network 120. CPU 126, also referred to as the printer CPU, includes one or more computer processors having circuitry that execute instructions. CPU 126 is configured to perform various methods and processes described herein by executing instructions. Instructions executed by CPU 126 include those required to operate, control, and/or coordinate the various assemblies and components of printing machine 10 described above. Such instructions are collectively referred to as printer controller program 130.

Memory 128 includes one or a combination of non-volatile and volatile memory storage devices. Exemplary storage devices include without limitation RAM modules and ROM modules, as well as optical, magnetic, and solid-state flash storage devices. Memory 128 may store printer controller program 130 and/or others which when executed, causes printing machine 10 to perform the methods and processes described herein.

User input panel 12 includes one or a combination of a keypad with buttons and a touch-sensitive screen which are configured to receive user input, such as printing requirements for duplicating document S (FIG. 2) placed on printing machine 10. Display screen 14 is configured to display print settings and can be a liquid crystal display or other type of electronic visual display device. When user input panel 12 includes a touch-sensitive screen, the touch sensitive screen may be layered over display screen 14 to facilitate user selection of print settings.

As discussed in the background section above, the distance that a sheet of paper travels within a printing machine may vary depending on the paper tray being used, and the travel distance could affect travel time and paper throughput within the printing machine. Paper throughput can be measured in terms of sheets per minute that are printed and then outputted by the printing machine when the printing machine takes sheets of a particular paper type from a tray. For example, a tray may be rated as having a throughput of 55.4 sheets per minute for A4 size having 100 g/m² grammage.

The travel distance, and possibly a combination of other factors, may significantly affect paper throughput within the printing machine. Travel distance may be the distance that the paper must travel, starting from its tray to the point at which ink or toner is first applied to the paper. In FIG. 2, the contact point with photoreceptor drum 60 is the point at which toner is first applied to the paper. In other printing machines, a photoreceptor drum places a toner image on an image transfer belt, and the image transfer belt transfers toner to the paper. For this configuration, the contact point with the image transfer belt is the point at which toner is first applied to the paper. This configuration may be used for color printing, where the printing machine has separate photoreceptor drums for each process color (such as cyan, magenta, yellow, and black for CMYK printing), and the printing machine forms toner images separately for various process colors, followed by combining the toner images on a transfer belt.

In addition to travel distance, other factors may significantly affect paper throughput, such as the speed of mechanisms associated with transporting sheets from a particular tray. For example, the conveyance mechanism for tray 2 may operate faster than the conveyance mechanism for tray 1 for a particular paper type, so tray 2 could be ranked higher than tray 1 for that paper type.

Trays may be ranked according to travel distance alone when travel distance has the greatest effect on paper throughput. More generally, trays may be ranked according to paper throughput, which takes into consideration travel distance and/or other significant factors. Trays associated with a lower travel distance or greater throughput are ranked higher. For example, a tray having a throughput of 55.4 sheets per minute for a particular paper type will be ranked higher than a tray having a throughput of 54 sheets per minute for the same paper type. Trays ranked higher are given higher priority, meaning that the printing machine will preferentially obtain paper from a tray with a ranking that is higher than the present tray. Thus, before printing a particular page of a print job, the printing machine could determine whether a tray with a ranking higher than the present tray is available. In this context, "available" means that a tray with higher ranking contains paper of the correct type for the particular page to be printed. If a higher ranking tray is available, the printing machine obtains paper from that tray instead of the present tray.

The "present tray" can be defined in more than one way. For example, A4 size paper is obtained from tray 2 for page 91 of a print job because tray 1 is empty, so tray 2 is considered to be the present tray for the next page (page 92) which is also to be printed on A4 size paper. Meanwhile, tray 1 is filled with A4 size paper and becomes available before page 92 is printed, so paper for page 92 is obtained from tray 1 if it is ranked higher than tray 2 for A4 size paper. In another example, the "present tray" could be the tray specified by a person (user). For the example, the user may have mistakenly believed that tray 1 was empty or contained the wrong paper type, so the user specified tray 2 for the print job. Tray 2 is the present tray, but paper is obtained from tray 1 if it is available and is ranked higher than tray 2.

In the above examples, the first condition for switching to a higher ranked tray from a present tray is that the higher ranked tray is no longer empty. Before switching to a higher ranked tray, CPU 126 checks whether the higher ranked tray contains a number of sheets above N1, where N1=0. N1 is an example of a first lower limit.

Applicant has found that the process of switching from one tray to another may have an adverse effect on paper throughput. In high-speed, commercial printing machines, sheets are obtained in rapid succession. Switching from a lower ranked tray to a higher ranked tray may result in more sheets per minute being processed after completion of the switching process, but the switching process itself may require a delay (for example, ½ second, 1 second or more) in the printing process due to mechanical and/or other reasons. For example, the paper conveying mechanisms within the printing machine may have to perform an additional operation to adjust to or prepare for taking paper from a different, newly selected tray. Thus, there could be a net decrease in paper throughput if switching to a higher ranked tray occurs many times during a print job or a batch of print jobs. This issue can be referred to as excessive tray switching.

To address excessive tray switching, the first condition uses N1 greater than zero, such as 50, 100, 200, 500, or other number. N1 can be a fixed number. That is, N1 can be the same (fixed) for multiple print jobs. N1 can be any number believed to be sufficient to avoid excessive switching between trays. For example, the first condition for switching to a higher ranked tray from a present tray is that the higher ranked tray contains a number of sheet above N1=100. Before switching to a higher ranked tray, CPU 126 checks whether the higher ranked tray contains over 100 sheets.

Alternatively, first lower limit N1 for the number of sheets in the higher ranked tray may vary and be based on the print job. The first condition can be that the higher ranked tray has enough sheets for an entire copy within a print job. For example, a print job may require that twenty copies of a 111-page document be printed on A4 size paper, so each copy requires NC=111 sheets of A4 size paper. NC is the total number of sheets of the current copy. The first condition is satisfied when the higher ranked tray contains a number of sheets greater than N1=110, which is equal to NC minus 1. Alternatively, the first condition is satisfied when the higher ranked tray contains a number of sheets greater than N1=111, which is equal to NC.

Alternatively, the first condition can be that the higher ranked tray has enough sheets for an entire print job. For example, the current print job may require that three copies of a 7-page document be printed on A4 size paper, so a total of NJ=21 sheets of A4 size paper are required for the entire print job. NJ is the total number of sheets of the current print job. The first condition is satisfied when the higher ranked tray contains a number of sheets greater than N1=20, which is equal to NJ minus 1. Alternatively, the first condition is satisfied when the higher ranked tray contains a number of sheets greater than N1=21, which is equal to NJ.

Examples for N1 described above are summarized in TABLE I below. The first condition is satisfied when the higher ranked tray contains a number of sheets greater than a first lower limit, N1. Any one or more of these examples can be in the printer control program.

TABLE I

| | First condition satisfied when . . . |
|---|---|
| N1 = 0 | higher ranked tray is not empty |
| N1 > 0 | higher ranked tray has more than 1 sheet; for example, N1 = 50, 100, or 200 . . . |
| N1 = NC or N1 = NC − 1 | higher ranked tray has enough sheets for the current copy |
| N1 = NJ or N1 = NJ − 1 | higher ranked tray has enough sheets for the current print job |

Another way to address excessive tray switching is to impose a second condition for switching to a higher ranked tray. The second condition is intended to postpone the switch to the higher ranked tray until a convenient or opportune time arises. The second condition relates to the occurrence of a change in printing condition which might cause a delay (for example, ½ second, 1 second, 2 seconds, or more) in the printing process due to mechanical reasons, image processing, and/or other reasons.

An example of a change in printing condition is a change in paper type to be used for the next page in the print job. For example, a single document may have 20 pages and require A4 size for pages 1 to 10, A3 size for page 11, and A4 size for pages 12 to 20. Trays 1 to 3 could be capable of holding A4 paper, and tray 1 is ranked highest but does not contain a number of sheets greater than N1. Tray 2 is ranked higher than tray 3 for A4 size paper, so printing begins by taking sheets from tray 2. Meanwhile, tray 1 is refilled with a number of A4 size sheets greater than N1, so the first condition is satisfied. However, switching to tray 1 is postponed because a change in printing condition has not occurred, so the printing process continues by taking A4 size sheets from tray 2. Page 11 requires an A3 size sheet, so the printing process takes an A3 size sheet from tray 4. Next, page 12 requires A4 size sheets. At this point, the second condition has been satisfied since a change in paper type (change from A3 size for page 11 to A4 size for page 12) has occurred. Thus, A4 size sheets are now taken from tray 1 instead of tray 2.

Another change in printing condition is a transition between copies (e.g., copy 1 of a multi-page document and copy 2 of the same multi-page document) within the same print job, and a transition between print jobs. Transitions could involve image processing by CPU 126, which can result in a delay between copies or between print jobs. That is, after the last page of copy 1 is printed, there could be a pause or delay due to image processing before the first page of copy 2 is printed. Also, after the last page of a print job is printed, there could be a pause or delay due to image processing before the first page of the next print job is printed.

Other changes in printing condition are transitions between printing requirements defined in the current print job. Examples include a transition between color and black and white (B&W) printing and a transition between one-sided versus duplex printing. For example, going from color to B&W printing (and vice versa) may require a printing machine to change its mechanical configuration, such as a paper path change between a single toner image transfer device (e.g., photoreceptor drum) and a multi-toner image transfer device (e.g., image transfer belt configured to carry multiple toner colors simultaneously). As a further example, going from single-sided to duplex printing (and vice versa) may require printing machine 10 to perform a paper path change so that paper goes to the paper reversing assembly 22. Any paper path change may include any of: activation or a change in direction of one or more rollers, and a change in the orientation of one or more paper guide rails. Any of these events could result in a delay in the printing process.

Another change in printing condition is an insertion activity of a collator, also referred to as an inserter. Collator 140 is illustrated schematically using broken lines in FIG. 1. Collator 140 includes a paper tray and a paper insertion device configured to insert one or more sheets of paper between two sheets of paper which have been output by paper ejection assembly 21 (FIG. 2) of printing machine 10. The paper insertion device is disposed adjacent the paper tray and may include an arm or roller attached to a motor. The arm or roller pushes a sheet from the collator tray between two sheets of paper which have been output by paper ejection assembly 21 of printing machine 10. The inserted sheets are referred to as inserts. The inserts can be blank or they may have an image which has been printed by another printing machine. To facilitate insertion by collator 140, printing machine 10 may intentionally pause or delay the printing and output of its printed sheets. For example, the inserts may be high-quality photographs to be included in a book or other publication. The current print job may specify that four photograph inserts (pages 21-24) be placed between pages 20 and 25 that were printed by printing machine 10.

Another change in printing condition is a changeover from first side printing to second side printing during groupwise duplex printing. As previously explained, the changeover includes a paper path change performed, after printing on the first sides of sheets of a group of sheets, to allow printing on the second sides of the sheets of the same group of sheets. Any paper path change may include any of: activation or a change in direction of one or more rollers, and a change in the orientation of one or more paper guide rails. Any of these operations could result in a delay in the printing process.

Other changes in printing condition are the completion of quality control operations within printing machine 10. Examples of quality control operations include print stabilization, color validation, and color calibration.

In a print stabilization operation, the printing machine performs an adjustment of its operating parameters to stabilize or improve image quality that could otherwise be degraded due to changes in operating conditions. The printer CPU may be programmed to initiate a stabilization operation based on changes in operating conditions, such as such as temperature of surrounding air or a component of the printing machine, humidity of surrounding air, and total number of pages printed. For example, the printer CPU may be programmed to initiate a stabilization operation every 500 or 1000 sheets printed. The printer CPU may be programmed to initiate a stabilization operation based on measurements by a temperature sensor and/or humidity sensor anywhere within the printing machine. The stabilization operation may include any one or more of: printing a toner pattern on the photoreceptor drum or transfer belt, using one or more sensors to measure characteristics of the toner pattern, adjusting operating parameters in a printing assembly for one or more process colors to change a light emission quantity of a laser emitter of the printing assembly, adjusting operating parameters in a printing assembly for one or more process colors to change aim of a laser beam B with respect to a photoreceptor drum, and using a scraper anywhere within the printing machine to remove residual toner from one or more photoreceptor drums and/or transfer belts. Any of these events could result in a delay in the printing process.

In a color validation operation, the printing machine prints a plurality of patches of different colors onto one or more sheets. Tens or hundreds of patches may be printed for a single color validation operation, and the patches may be printed on one or more sheets. For high-quality print jobs, thousands of patches may be printed. A color sensor in the printing machine measures color characteristics of the patches, compares the measurements to target color characteristics, and generates a validation result based on the comparison. The validation result could be displayed on display screen 14 or transmitted via network 120 to a remote computer.

In a color calibration operation, the printing machine uses the validation result to adjust printing assembly 18 so that colors are printed closer to the target color characteristics. For example, the printing machine may have separate developing assemblies and laser assemblies for each process color. Each developing assembly may be similar to developing assembly 65 in FIG. 2. Each laser assembly may be similar to that containing the laser emitter and mirrors 62, 63 in FIG. 2. The printer CPU analyzes the validation result and, based on the analysis, adjusts the operation parameters of one or more of the developing assemblies, laser assemblies, and other components to alter application of toner for one or more of the process colors. The analysis and adjustment may result in a delay in the printing process.

TABLE II shows a summary of example changes in printing condition, as described above, which can satisfy the second condition for switching to a higher ranked tray. Any one or more of these examples can be in the printer control program. As discussed above, implementation of the second condition is intended to postpone the switch to the higher ranked tray even when the first condition has been satisfied. The switch to the higher ranked tray is made when the second condition occurs.

TABLE II

Second condition satisfied when there is . . .

a change in paper type to be used for next page in print job
a transition between two multi-page document copies within the print job
a transition from the current print job to a subsequent print job
a transition between printing requirements defined in the current print job, such as:
a transition between color and B&W printing (color to B&W, or B&W to color)
a transition between single-sided printing and duplex printing (single-sided to duplex, or duplex to single-sided)
an insertion activity of a collator
a changeover between first side printing and second side printing during groupwise duplex printing
a quality control operation, such as:
a print stabilization operation
a color validation operation
a color calibration operation A switch to the higher ranked tray is not made when the first condition is not satisfied, that is, when the higher ranked tray does not have a sufficient number of sheets. Also, a switch to the higher ranked tray is not made when the first condition is satisfied but the second condition is not satisfied, that is when a particular change in printing condition has not yet occurred. When a switch to the higher ranked tray is not made, then paper is taken from the present tray if the present tray contains at least one sheet. If the present tray is empty, then an alternative tray must be selected by the printer CPU for obtaining the next sheet. The alternative tray would be a lower ranked tray, and the process would switch to taking sheets from that lower ranked tray. However, Applicant has found that switching to the lower ranked tray may result in excessive tray switching in some circumstances. To address this possibility of excessive tray switching, conditions to switching to the lower ranked tray may be imposed similar to those discussed above for switching to the higher ranked tray.

Figure 4:
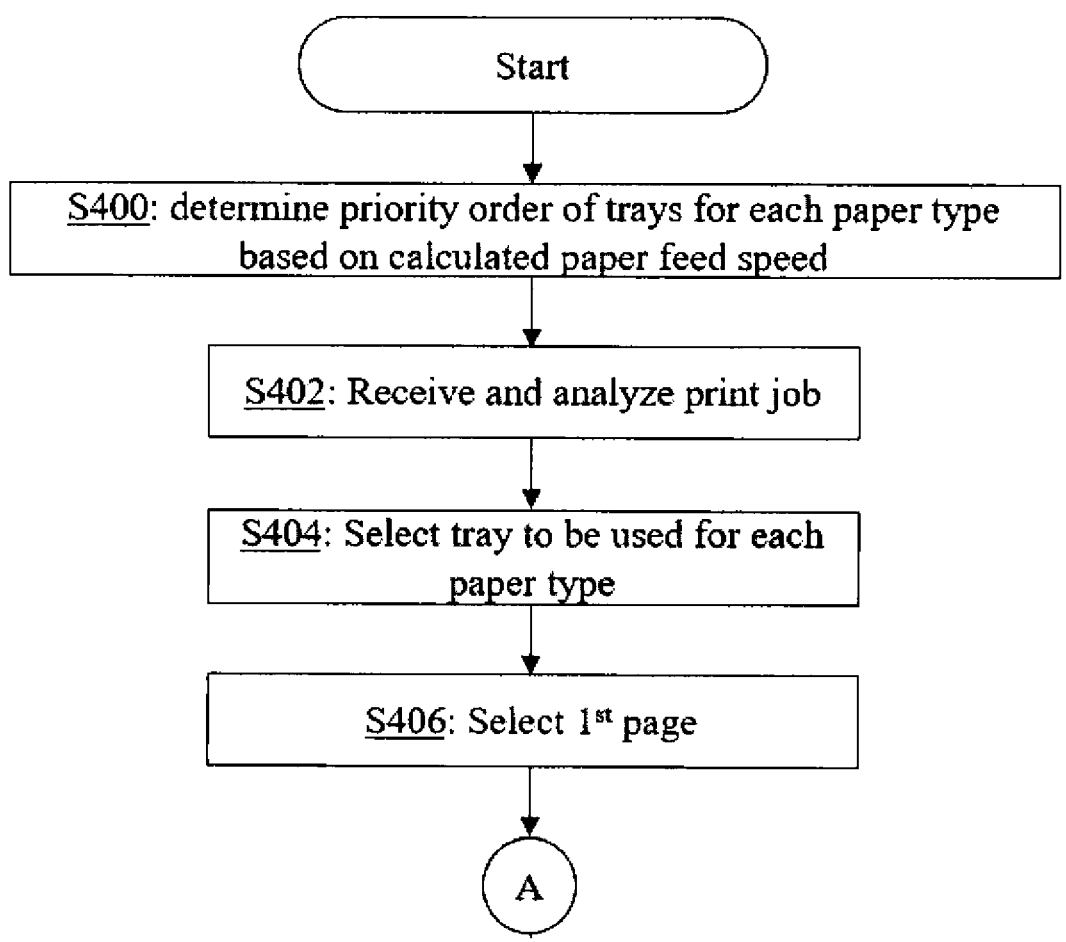
FIG. 4 is a flow diagram showing an example printing process.
Figure 5:
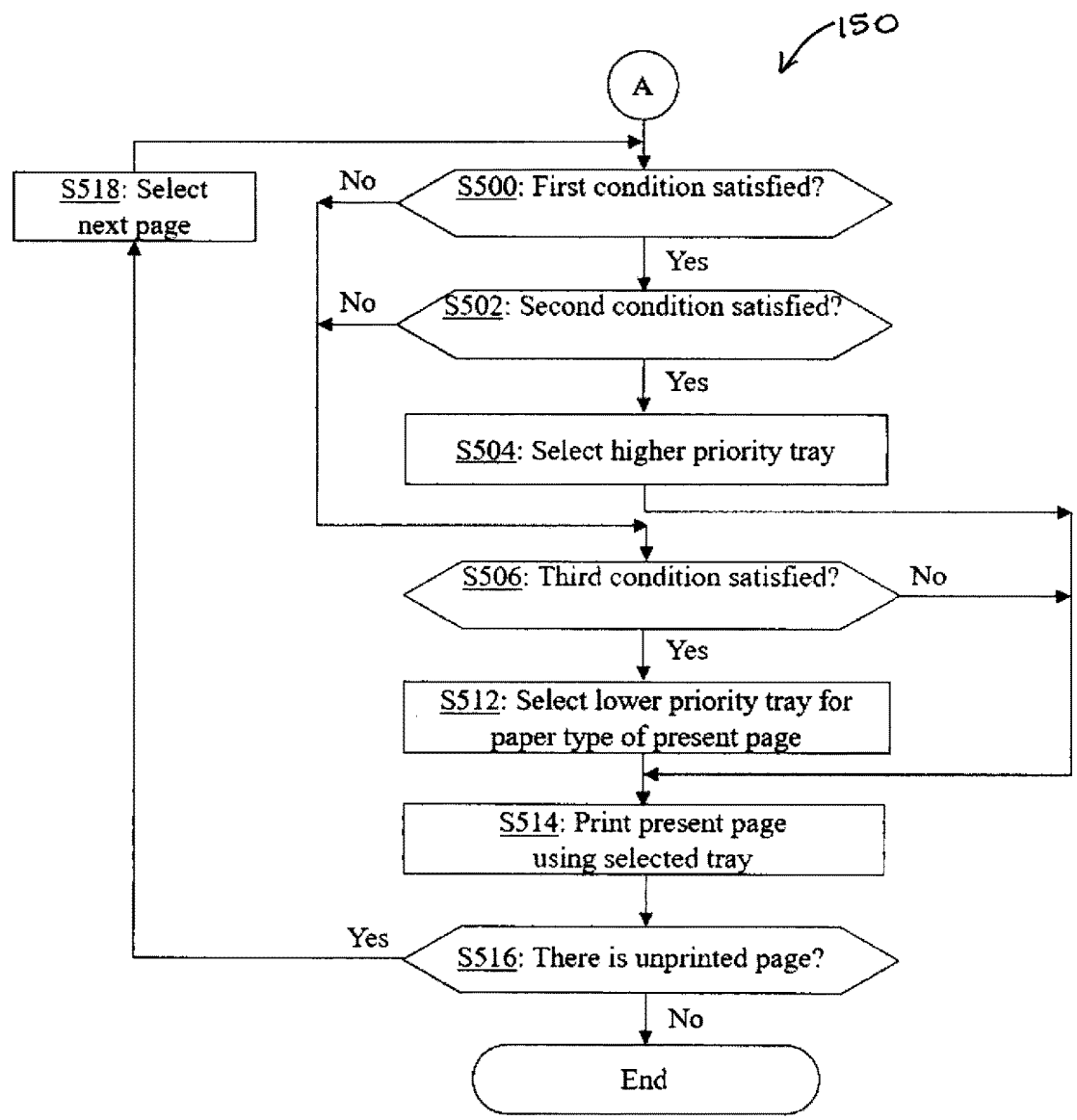
FIG. 5 is a flow diagram showing an example tray selection process.

FIGS. 4 and 5 illustrate a process which imposes conditions on both switching to a higher ranked tray and switching to a lower ranked tray. Ranking is based on paper throughput associated with a particular tray, and the printing machine gives preference to trays having higher ranking. In the following description, the term "higher ranked tray" refers to a tray ranked higher than the present tray, and the term "lower ranked tray" refers to a tray ranked lower than the present. Generally, the printing machine will take paper from a higher ranked tray instead of the present tray when both the first and second conditions are satisfied. Otherwise, paper will be taken from a lower ranked tray if a third condition is satisfied. Otherwise, paper will be taken from the present tray.

The process of FIG. 4 continues to that of FIG. 5. At block S400 of FIG. 4, the printing machine determines the ranking of trays for each paper type. The determination can be based on a calculated paper feed speed, which refers to the amount of time a sheet of paper travels from the tray to a point where ink or toner is applied for the first time by the printing machine onto the sheet of paper. Trays that result in the greatest speed or the lowest time are ranked highest.

At block S402, a print job is received by the printing machine and is analyzed by the printer CPU. The print job can be received via a network connection or when a user places one or more documents on the printing machine for copying. The analysis is performed by the printer CPU and includes the printer CPU identifying the paper type(s) required for pages of the print job. At block S404, trays are selected by the printer CPU for each of the paper types identified by the printer CPU. At block S406, the printer CPU selects the first page of the print job to be printed, and then the process proceeds to FIG. 5.

It is to be understood that the CPU has already identified the paper type for the first page and has selected, at block S404 in FIG. 4, a tray that is appropriate for the paper type of the first page. The selected tray for the various pages of the print job is referred to as the "present tray" in the descriptions for FIG. 5. The present tray may be the tray specified in the print job. Alternatively, the present tray may be the highest ranked tray for the paper type at the time when block S404 was performed. However, as printing proceeds over time, the fill status and availability of the trays may change, so it may be necessary to switch to a lower ranked tray and switch back to a higher ranked tray at various times.

At block S500 of FIG. 5, the printer CPU checks for a first condition in which a higher ranked tray contains a number of sheets above a first lower limit, N1. The first lower limit N1 can be defined according to any of the examples in TABLE I above. The first condition is not satisfied (S500: NO) when a higher ranked tray does not contain a number of sheets above the first lower limit, N1. The first condition is satisfied (S500:YES) when a higher ranked tray contains a number of sheets above the first lower limit, N1.

If S500:YES, at block S502 the printer CPU checks for a second condition corresponding to a change in printing condition occurring in the printing machine. The printing condition may be unrelated to the number of number of sheets contained in the higher ranked tray. The printing condition can be any of the examples in TABLE II above. The second condition is not satisfied (S502:NO) when a change in printing condition does not occur. The second condition is satisfied (S502:YES) when a change in printing condition occurs.

When both the first condition (S500:YES) and the second condition (S502:YES) are satisfied, the printer CPU selects the higher ranked tray from which to take a sheet. That is, the printer CPU switches its tray selection from the present tray to the higher ranked tray. This occurs at block S504. It is to be understood that the first and second conditions are concurrent requirements, meaning that both the first condition and the second condition must be positive in order to select the higher ranked tray.

When any one of the first condition (S500:NO) or the second condition (S502:NO) is not satisfied, the process skips S504 and proceeds to S506. At this point, it has already been determined that a sheet should not be taken from a higher ranked tray, so the sheet could be taken from the present tray. However, it may be better to take the sheet from a lower ranked tray, which is a tray that is ranked lower than the present tray. A sheet is taken from the lower ranked tray under a certain condition.

At block S506, the printer CPU checks for a third condition in which the present tray contains a number of sheets below second lower limit, N2. This is different from the first condition concerning a number of sheets above a certain number. Examples for N2 are shown in TABLE III below. In the table, NC is the total number of sheets of the current copy. NJ is the total number of sheets of the current print job. Any one or more of these examples can be in the printer control program.

TABLE III

| | Third condition satisfied when . . . |
|---|---|
| N2 = 1 | Present tray is empty (has less than 1 sheet) |
| N2 > 1 | present tray is has less than a specified number of sheets; for example, N2 = 5, 10, or 50 . . . |
| N2 = NC | present tray does not have enough sheets for the current copy |
| N2 = NJ | present tray does not have enough sheets for the current print job |

For example, at block S506, the printer CPU checks for a third condition in which the present tray contains a number of sheets below N2=1. In effect, the third condition is satisfied when the present tray is empty, that is, when the present tray contains less than one sheet.

N2 can be any number believed to be sufficient to avoid excessive switching between trays. For example, the third condition for switching to a lower ranked tray from a present tray is that the present tray has too few sheets, which would likely lead to another switching of trays very soon. For example, at block S506, the printer CPU checks for a third condition in which the present tray contains a number of sheets below N2=5. In effect, the third condition is satisfied when the present tray contains less than 5 sheets. N2 can be 10, 20, 50, or other number which is appropriate for the speed and volume of a printing environment. In an office environment, 5 or 10 sheets may be considered to be too few for the present tray. In a commercial print shop, 20 or 50 sheets may be considered to be too few for the present tray. N2 can be a fixed number. That is, N2 can be the same (fixed) for multiple print jobs.

In another example, at block S506, the printer CPU checks for a third condition in which the present tray contains a number of sheets below N2, with N2=NC. NC is the total number of sheets of the current copy. In effect, the third condition is satisfied when the present tray does not have enough sheets for the current copy. For instance, a print job may require that twenty copies of a 111-page document be printed on A4 size paper, so each copy requires NC=111 sheets of A4 size paper. The third condition is satisfied when the present tray does not have enough sheets for a single copy to the 111-page document.

In still another example, at block S506, the printer CPU checks for a third condition in which the present tray contains a number of sheets below N2, with N2=NJ. NJ is the total number of sheets of the print job. In effect, the third condition is satisfied when the present tray does not have enough sheets for the current print job. For example, the current print job may require that three copies of a 7-page document be printed on A4 size paper, so a total of NJ=21 sheets of A4 size paper are required for the entire print job. The third condition is satisfied when the present tray does not have enough sheets for the 21-page print job.

The third condition is satisfied (S506:YES) when the present tray contains less than N2 sheets. When this occurs, the printer CPU selects a lower ranked tray from which to take a sheet. That is, the printer CPU switches its tray selection from the present tray to the lower ranked tray. This occurs at block S512, and the process proceeds to block S514.

The third condition is not satisfied (S506:NO) when the present tray contains at least N2 sheets. When this occurs, the printer CPU does not switch its selection, and the process skips S512 and proceeds to S514.

At block S514, the present page of the print job is printed. The printer CPU causes conveying mechanisms in the printing machine to take a sheet from the selected tray, which can be either the present tray (if S506:NO), a lower ranked tray (if S506:YES), or a higher ranked tray (if S500:YES and concurrently S502:YES). The sheet is conveyed to the printing assembly where an imaged is printed on it, and the process proceeds to block S516.

Tray selection cycle 150 is repeated until all pages of the print job or a batch of print jobs are printed. At block S516, it is determined whether there is an unprinted page. The printer CPU determines whether the print job or batch of print jobs has another page (referred to as the next page) which has not been printed. If not (S516:NO), the process could end. If yes (S516:YES), the next page is selected for printing at block S518, and the process returns to block S500. By default, the tray previously used for a particular paper type will be the present tray for the next page if the same paper type is required. For example, if a print job specifies the same paper type for all pages and page one is printed from a sheet taken from tray 1 at S514, then tray 1 will be the present tray for page two at S500.

Figure 6:
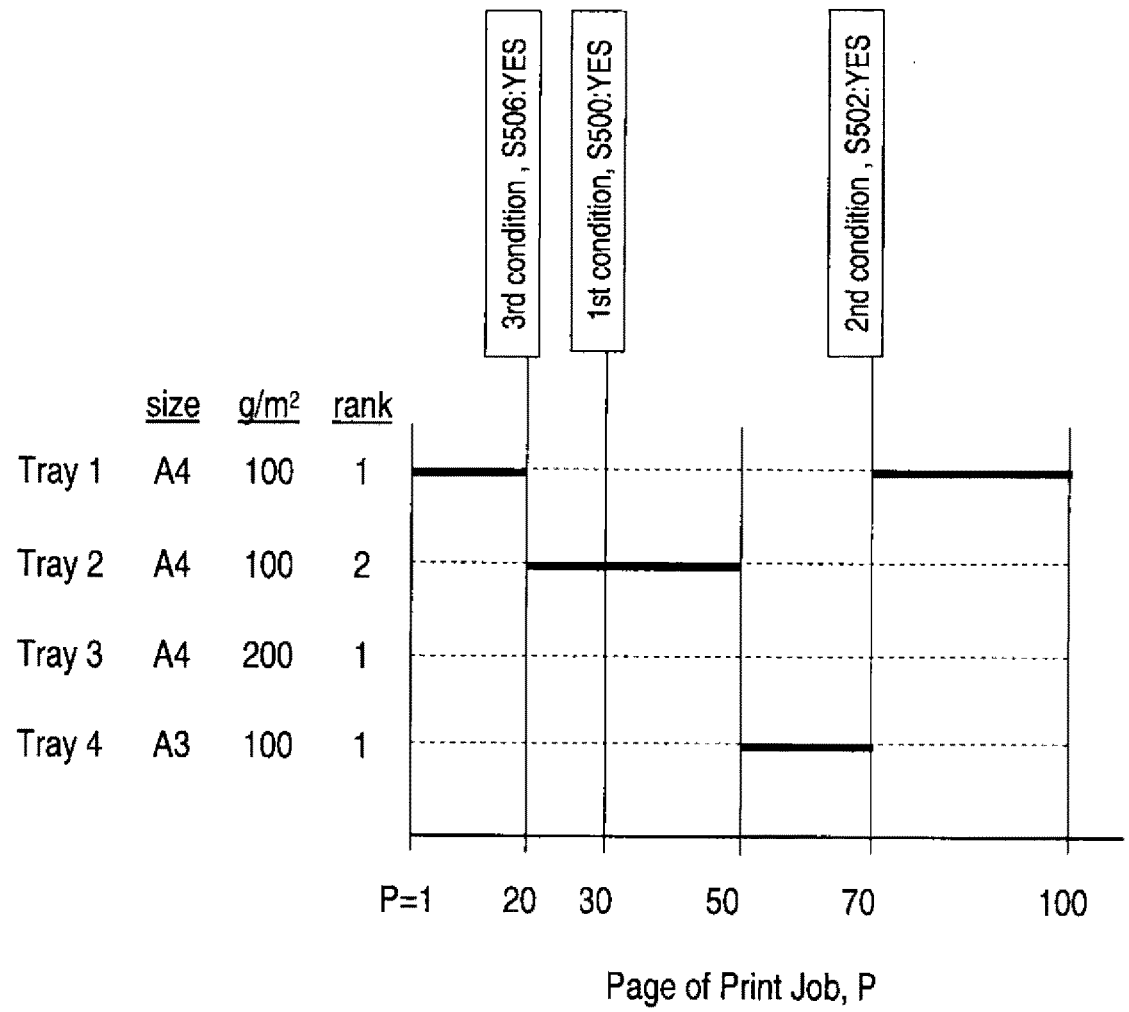
FIG. 6 is a graph showing an example print job processed according to the tray selection process of FIG. 5.

In FIG. 6, an example print job further illustrates the process of FIGS. 4 and 5. The horizontal axis in the graph indicates the current page to be printed. The print job has an arbitrary number for pages P, for example, P=100. The print job specifies that pages 1-49 should be printed on A4 paper with 100 g/m² grammage, pages 50-69 should be printed on A3 paper with 100 g/m² grammage, and pages 70-100 should be printed on A4 paper with 100 g/m² grammage.

The vertical axis indicates the trays in the printing machine. Trays 1 and 2 contain A4 size paper with 100 g/m² grammage (abbreviated as A4 100 gsm). For this paper type, the printer CPU has determined (at S400) that tray 1 is ranked higher than tray 2. Tray 3 contains A4 200 gsm, and the printer CPU has (at S400) ranked it highest for that paper type. Tray 4 contains A3 100 gsm, and the printer CPU has (at S400) ranked it highest for that paper type.

Before printing begins, tray 1 has nineteen sheets of A4 100 gsm, tray 2 contains a hundred sheets of A4 100 gsm, and tray 4 contains a hundred sheets of A4 100 gsm. Tray 3 is not relevant since it does not have a paper type required by the current print job.

The print job is received by the printing machine. The printer CPU analyzes the print job (S402) and selects the tray to be used for each paper type specified in the print job (S404). For example, the printer CPU selects tray 1 for the pages 1-49 and 71-100 because those pages must be printed on A4 100 gsm. The printer CPU selects tray 4 for pages 50-69 because those pages must be printed on A3 100 gsm.

Beginning with the first page (P=1) of the print job, the printer CPU has already selected tray 1 (at FIG. 4, S404), so tray 1 is the present tray. Before taking a sheet from the present tray, the printer CPU checks for a first condition in which a higher ranked tray contains a number of sheets above first lower limit N1. There is no tray that is ranked higher than tray 1 for A4 100 gsm (S500:NO), so the printer CPU checks for a third condition in which in which the present tray (tray 1) contains a number of sheets below second lower limit N2. In this example, the printer control program has previously set N2=1, so the printer CPU checks for a third condition in which in which the present tray (tray 1) contains less than 1 sheet. Tray 1 contains nineteen sheets, as mentioned above, so the third condition is not satisfied (S506:NO), a sheet is taken from the present tray (tray 1) and is printed with an image specified in the print job (S514). Tray 1 started with nineteen sheets of A4 100 gsm, so the above process for page P=1 repeats for subsequent pages until page P=20.

At page P=20, the third criteria is satisfied (S506: YES) because the present tray (tray 1) contains less than 1 sheet. That is, the present tray is empty. The printer CPU selects tray 2, which is a lower priority tray for A4 100 gsm (S512). A sheet is taken from the tray 2 and is printed with an image specified in the print job (S514).

Tray 2 started with a hundred sheets of A4 100 gsm, so the process for P=20 repeats for subsequent pages which must be printed on A4 100 gsm until page P=49. By default, the tray used for the current page will be the present tray of the next page. For example, the present tray for page 21 at FIG. 5, S500 will be tray 2 because tray 2 was used for page 20. Sheets are taken from tray 2 until page P=49. Tray 2 is used even after tray 1 is refilled with a hundred sheets of A4 100 gsm when the printing machine is printing page P=29.

For page P=30, the tray selection cycle begins with tray 2 being the present tray because tray 2 was used for P=29. The printer CPU checks at S500 for a first condition in which a higher ranked tray contains a number of sheets above first lower limit N1. This check is performed for all pages, but for P=30, the printer CPU finds that tray 1 now contains a number of sheets above first lower limit N1 (S500:YES). This is because, the printer control program has previously set N1=20, and tray 1 had been refilled with a hundred sheets of A4 100 gsm. As a result, the printer CPU checks for a second condition corresponding to a change in printing condition occurring in the printing machine. For example, if there are no changes in the example printing conditions of TABLE II (S502:NO), then the printer CPU checks for a third condition concerning the number of pages in the present tray (S506) before printing. Ultimately, printing continues with the present tray (tray 2) for pages P=30 to 49 even though tray 1, a higher ranked tray, contains sheets of the same paper type.

For page P=50, tray 4 is the present tray at the start of the tray selection cycle because the printer CPU had determined (at FIG. 4, S404) that tray 4 contained the appropriate paper type (A3 100 gsm) for page 50 of the print job. There is no higher ranked tray for this paper type (S500:NO), and tray 4 contains a sufficient number of sheets (S506:NO), so paper is taken from the present tray (tray 4) and printed with an image specified in the print job (S514). The process for P=50 is repeated for pages P=51 to 69 since tray 4 started with a hundred sheets.

Page P=70 is to be printed on A4 100 gsm according to the print job. The tray selection cycle for P=70 begins (at FIG. 5, S500) with the present tray being tray 2 since tray 2 was most recently used for that paper type. By default, the tray previously used for a particular paper type will be the present tray for the next page that needs the same paper type. The printer CPU checks for a first condition in which a higher ranked tray contains a number of sheets above first lower limit N1. The printer control program has previously set N1=20. Tray 1 is ranked higher than tray 2 for A4 100 gsm, and it had been refilled with a hundred sheets of A4 100 gsm. The first condition is satisfied (S500:YES) because tray 1 contains more than 20 sheets. As a result, the printer CPU checks for a second condition corresponding to a change in printing condition occurring in the printing machine (S502). The previous page (P=69) was printed on A3 100 gsm, which is different from the current paper type. Because of this change in paper type, the printer CPU determines that a second condition is satisfied. As a result, the printer CPU selects the higher ranked tray, which is tray 1 (S504), paper is taken from tray 1 and printed with an image specified in the print job (S514). The process for P=71 is repeated for P=72 to 100 since tray 1 has ninety-nine sheets of A4 100 gsm remaining.

Figure 7:
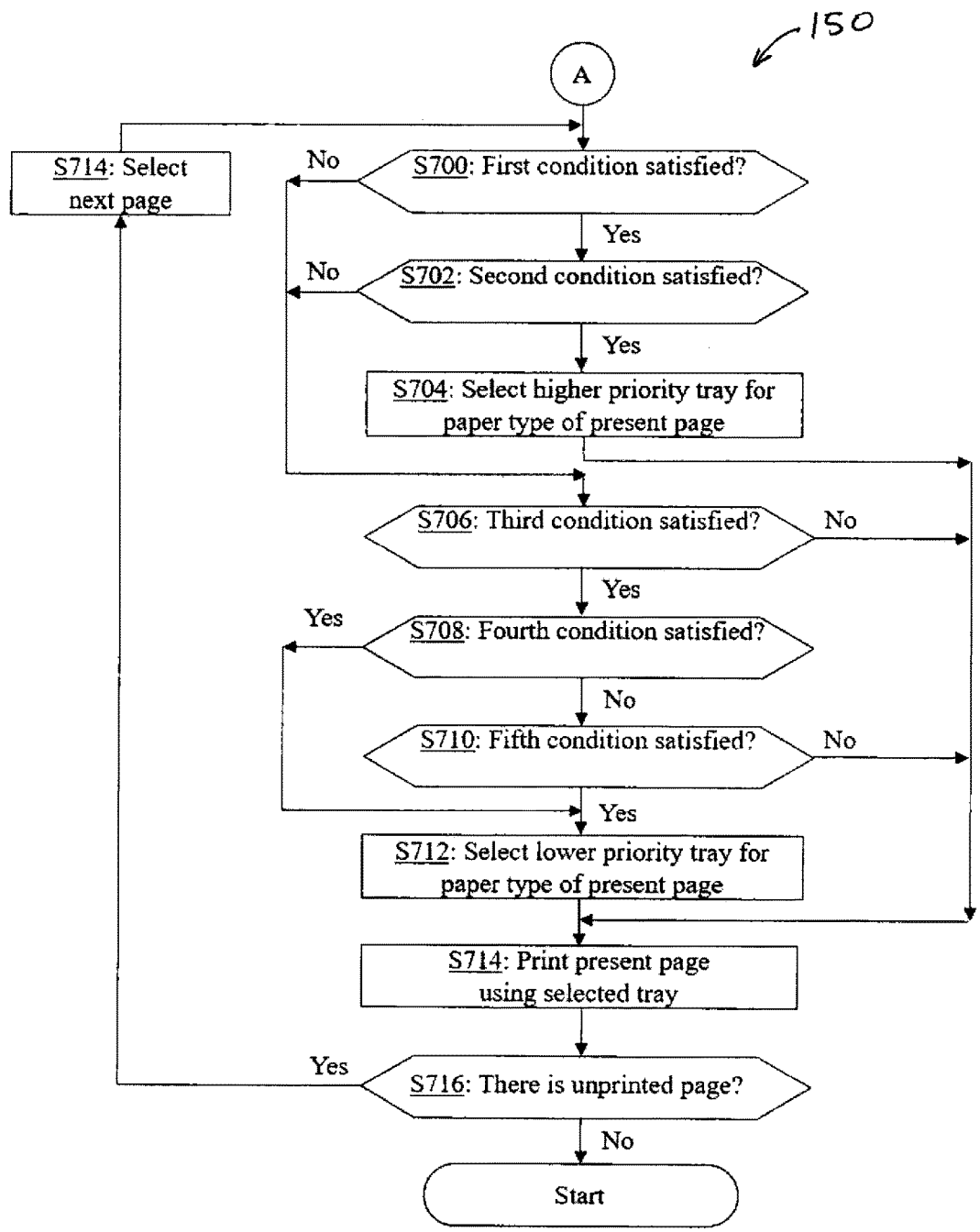
FIG. 7 is a flow diagram showing another example tray selection process.

FIG. 7 shows another example of tray selection process 150. Additional conditions are placed on switching to a lower ranked tray that may help to improve efficiency. The printing process begins with FIG. 4 up to point A, which continues to point A in FIG. 7. The additional conditions appear at blocks S708 and S710. Unless specified below, blocks S700-706 and S712-718 in FIG. 7 are the same as blocks S500-506 and S512-518 in FIG. 5.

When both the first condition (S700:YES) and the second condition (S702:YES) are satisfied, the printer CPU selects the higher ranked tray from which to take a sheet. That is, the printer CPU switches its tray selection from the present tray to the higher ranked tray. This occurs at block S704. The first and second conditions for FIG. 0.7 can be the same as those described for FIG. 5. The examples in TABLE I for the first condition and TABLE II for the second condition can be used in S700 and S702.

When any one of the first condition (S700:NO) or the second condition (S702:NO) is not satisfied, the process proceeds to block S706. At this point, it has already been determined that a sheet should not be taken from a higher ranked tray, so the sheet could be taken from the present tray. However, it may be better to take the sheet from a lower ranked tray, which is a tray that is ranked lower than the present tray. A sheet is taken from the lower ranked tray under a third condition (S706), a fourth condition (S708), and a fifth condition (S710).

In summary, a third condition checks whether the present tray is low on sheets, in which case it could be advantageous to switch to a lower ranked tray (a higher ranked tray has been ruled out) before the present tray goes empty. If the present tray is low on sheets, a fourth condition checks whether it is a good time to switch to a lower ranked tray. The fourth condition is intended to postpone the switch to the lower ranked tray to reduce the possibility of excessive tray switching, which can lead to inefficiency. Even if it is not a good time to switch to a lower ranked tray, a fifth condition checks whether the present tray is empty so that the switch to the lower rank tray occurs nonetheless.

Referring again to FIG. 7, at block S706, the printer CPU checks for a third condition in which the present tray contains a number of sheets below second lower limit N2. The third condition applied at S706 can be the same as those described for FIG. 5, S506. The examples in TABLE III for the third condition can be used in S706. Again, the third condition is intended to check whether the present tray is low on sheets instead of being completely empty. Therefore, it is preferable that N2>1 because N2=1 corresponds to checking whether the tray is empty.

If the present tray is low on sheets (S706:YES), the CPU checks at S708 for a fourth condition corresponding to a change in printing condition occurring in the printing machine. The fourth condition may be unrelated to the number of number of sheets contained in the present tray. The printing condition can be any one or a combination of the examples in TABLE II above. The fourth condition is not satisfied (S708:NO) when a change in printing condition does not occur. The fourth condition is satisfied (S708:YES) when a change in printing occurs.

When the fourth condition is satisfied (S708:YES), the printer CPU selects a lower ranked tray from which to take a sheet. That is, the printer CPU switches its tray selection from the present tray to the lower ranked tray. This occurs at block S712.

When the fourth condition is not satisfied (S708:NO), the printer CPU checks whether the present tray is empty at S710. For example, the CPU can check at S710 for a fifth condition in which the present tray contains a number of sheets below N2, with N2=1. If empty (S710:YES), the process proceeds to S712 where the printer CPU switches its tray selection from the present tray to the lower ranked tray. After S712, the process proceeds to S714. When any one of the third condition (S706:NO) or the fifth condition (S710:NO) is not satisfied, the process skips S712 and process proceeds to S714, so the present tray is used for printing.

Figure 8:
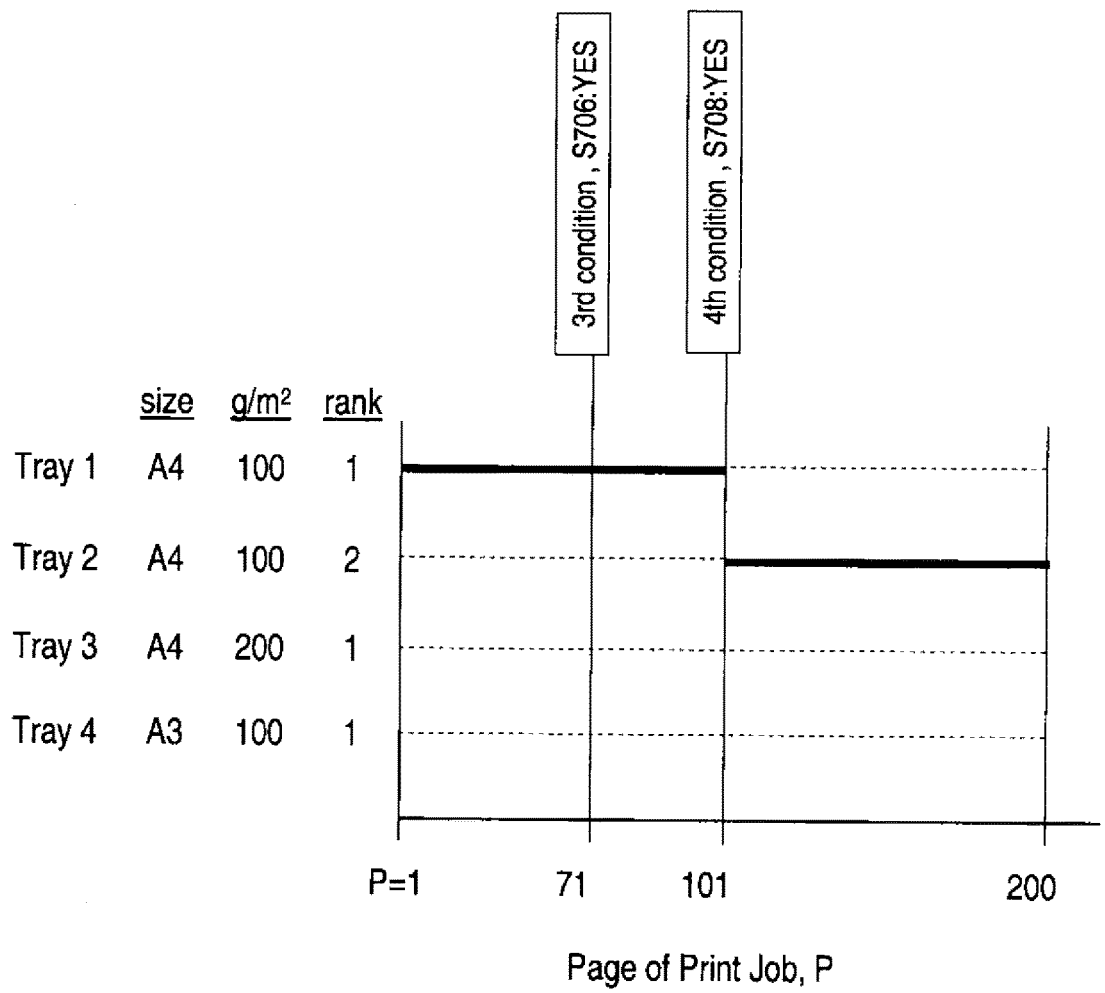
FIG. 8 is a graph showing another example print job processed according to the tray selection process of FIG. 7.

In FIG. 8, an example print job further illustrates the process of FIG. 7. The horizontal and vertical axes are as described for FIG. 6. The print job has an arbitrary number for pages P, for example, P=200. The print job specifies that two copies of a 100-page document be printed on A4 paper with 100 g/m² grammage (abbreviated as A4 100 gsm). Before printing, trays 1 and 2 each contain 120 sheets of A4 size 100 gsm. For this paper type, the printer CPU has determined (S400) that tray 1 is ranked higher than tray 2. Trays 3 and 4 are not relevant since they do not have a paper type required by the print job.

Beginning with the first page (P=1) of the print job, the printer CPU has already selected tray 1 (at FIG. 4, S404), so tray 1 is the present tray. Before taking a sheet from the present tray, the printer CPU checks for a first condition in which a higher ranked tray contains a number of sheets above first lower limit N1. There is no tray that is ranked higher than tray 1 for A4 100 gsm (S700:NO), so the printer CPU checks for a third condition in which in which the present tray (tray 1) contains a number of sheets below second lower limit N2. In this example, the printer control program has previously set N2=50, so the printer CPU checks for a third condition in which in which the present tray (tray 1) contains less than 50 sheets. Tray 1 contains 120 sheets, as mentioned above, so the third condition is not satisfied (S706:NO), a sheet is taken from the present tray (tray 1) and is printed with an image specified in the print job (S714). The tray selection is repeated for each subsequent page of the print job.

Again, tray 1 started with 120 sheets, so when the process reaches page P=70, there are fifty sheets remaining in tray 1. At P=71, there are forty-nine sheets remaining in tray 1. Before taking a sheet for P=71, the printer CPU checks for a first condition in which a higher ranked tray contains a number of sheets above first lower limit N1. There is no tray that is ranked higher than tray 1 for A4 100 gsm (S700:NO), so the printer CPU checks for a third condition in which in which the present tray (tray 1) contains a number of sheets below second lower limit N2, with N2=50. Tray 1 contains forty-nine sheets, as mentioned above, so the third condition is satisfied (S706:YES), which means that tray 1 is getting to be low on sheets and it could be time to switch to a lower ranked tray. However, before switching to a lower ranked tray, the printer CPU checks whether now is a good time to switch to a lower ranked tray. The printer CPU checks for a fourth condition corresponding to a change in printing condition occurring in the printing machine. The printing condition can be any one or a combination of the examples in TABLE II above. In this example, it is assumed that there is no change in printing condition until P=101.

The tray selection cycle for page P=101 begins (at FIG. 7, S700) with the present tray being tray 1 since tray 1 was most recently used for A4 100 gsm, which is the paper type required for P=101. By default, the tray previously used for a particular paper type will be the present tray for the next page that needs the same paper type. The printer CPU checks for a first condition in which a higher ranked tray contains a number of sheets above first lower limit N1. There is no tray that is ranked higher than tray 1 for A4 100 gsm (S700:NO), so the printer CPU checks for a third condition in which in which the present tray (tray 1) contains a number of sheets below second lower limit N2, with N2=50. Tray 1 has 20 sheets remaining from its original 120 sheets, so the third condition is satisfied (S706:YES). As a result, the printer CPU checks for a fourth condition corresponding to a change in printing condition occurring in the printing machine. The previous page (P=100) was the last page of the first copy of the 100-page document of the print job. The current page (P=101) is the first page of the second copy of the 100-page document, which means there is now a transition between two multi-page document copies within the current print job. Because of this transition, the printer CPU determines that a fourth condition is satisfied. As a result, the printer CPU selects at S712 a lower ranked tray, namely tray 2, even though tray 1 is not empty. Paper is taken from tray 2 and printed with an image specified in the print job (S714). The process for P=101 is repeated for P=102 to 200 since tray 2 has 119 sheets of A4 100 gsm remaining.

From the forgoing descriptions, tray selection in printing may involve checking for the availability of paper trays which may provide increased paper throughput, and by postponing a switch to use such trays to help avoid excessive tray switching that could adversely affect paper throughput. When a higher ranked tray is unavailable, tray selection may involve checking the availability of lower ranked trays before the present tray is empty, and by postponing a switch to such trays to help avoid excessive tray switching. A change in printing condition may provide a convenient and opportune time to switch between trays without adversely affecting paper throughput.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method for printing comprising:
    receiving a print job in a printing machine; and
    printing a page of the print job, wherein the printing includes performing a tray selection process for selecting a tray among a plurality of trays from which paper will be obtained for printing the page of the print job, the plurality of trays comprises a present tray and a higher ranked tray ranked higher than the present tray, and the tray selection process comprises:
    checking for a first condition in which the higher ranked tray contains a number of sheets above a first lower limit,
    checking for a second condition corresponding to a change in printing condition occurring in the printing machine unrelated to the number of sheets contained in the higher ranked tray, and
    obtaining a sheet for printing the page, the sheet obtained from the higher ranked tray when the first and second conditions are satisfied, the sheet obtained from the present tray or other tray when any one or both of the first and second conditions are not satisfied, the other tray being among the plurality of trays and being ranked lower than the present tray; and
    printing additional pages of the print job, wherein the printing of each additional page comprises performing the tray selection process for the additional page,
    wherein the change in printing condition is selected from the group consisting of: a change in paper type, a transition between printing requirements defined in the print job, a changeover between first side printing and second side printing during group-wise duplex printing, a transition between two multi-page document copies within the print job, an insertion activity of a collator, and completion of a quality control operation within the printing machine.

2. The method of claim 1, wherein ranking of the trays is based on paper throughput, such that a paper throughput for the higher ranked tray is greater than a paper throughput for the present tray.

3. The method of claim 1, wherein the printing machine comprises a rotating surface configured to transfer an image onto the obtained sheet, ranking of a subject tray among the plurality of trays is based, at least, on paper travel distance from the subject tray to the rotating surface, such that a paper travel distance for the higher ranked tray is less than a paper travel distance for the present tray.

4. The method of claim 1, wherein the change in printing condition is limited to any one of: a change in paper type, a transition between printing requirements defined in the print job, and a changeover between first side printing and second side printing during group-wise duplex printing.

5. The method of claim 1, wherein the change in printing condition is limited to any one of: a transition between two multi-page document copies within the print job, and an insertion activity of a collator.

6. The method of claim 1, wherein the change in printing condition is limited to completion of a quality control operation within the printing machine, the quality control operation being any one of: a print stabilization operation, a color validation operation, and a color calibration operation.

7. The method of claim 1, wherein:
    the tray selection process further comprises checking for a third condition in which the present tray contains a number of sheets below a second lower limit,
    the sheet for printing is obtained from the other tray when (a) any of one or both of the first and second conditions are not satisfied and, concurrently (b) the third condition is satisfied, and
    the sheet for printing is obtained from the present tray when (a) any of one or both of the first and second conditions are not satisfied and, concurrently (b) the third condition is not satisfied.

8. The method of claim 7, wherein:
the tray selection process further comprises checking for a fourth condition corresponding to a change in printing condition occurring in the printing machine unrelated to the number of number of sheets contained in the present tray,
the sheet for printing is obtained from the other tray when (a) any of one or both of the first and second conditions are not satisfied, concurrently (b) the third condition is satisfied, and concurrently (c) the fourth condition is satisfied,
the sheet for printing is obtained from the present tray when (a) any of one or both of the first and second conditions are not satisfied, concurrently (b) the third condition is satisfied, and concurrently (c) the fourth condition is not satisfied.

9. A printing machine comprising:
a plurality of trays comprising a first tray, a second tray, and a third tray;
a printer processor configured to analyze a print job received by the printing machine, and to perform a tray selection process for selecting a tray among the plurality of trays from which paper will be obtained for printing a plurality of pages of the print job, the plurality of trays comprising a present tray and a higher ranked tray ranked higher than the present tray, the tray selection process for each one of a plurality of pages comprising:
checking for a first condition in which the higher ranked tray contains a number of sheets above a first lower limit,
checking for a second condition corresponding to a change in printing condition occurring in the printing machine unrelated to the number of sheets contained in the higher ranked tray, and
obtaining a sheet for printing the page, the sheet obtained from the higher ranked tray when the first and second conditions are satisfied, the sheet obtained from the present tray or other tray when any one or both of the first and second conditions are not satisfied, the other tray being among the plurality of trays and being ranked lower than the present tray; and
a printing assembly configured to print an image on the obtained sheet,
wherein the change in printing condition is selected from the group consisting of: a change in paper type, a transition between printing requirements defined in the print job, a changeover between first side printing and second side printing during group-wise duplex printing, a transition between two multi-page document copies within the print job, an insertion activity of a collator, and completion of a quality control operation within the printing machine.

10. The printing machine of claim 9, wherein ranking of the trays is based on paper throughput, such that a paper throughput for the higher ranked tray is greater than a paper throughput for the present tray.

11. The printing machine of claim 9, wherein the printing machine comprises a rotating surface configured to transfer an image onto the obtained sheet, ranking of a subject tray among the plurality of trays is based, at least, on paper travel distance from the subject tray to the rotating surface, such that a paper travel distance for the higher ranked tray is less than a paper travel distance for the present tray.

12. The printing machine of claim 9, wherein the change in printing condition is limited to any one of: a change in paper type, a transition between printing requirements defined in the print job, and a changeover between first side printing and second side printing during group-wise duplex printing.

13. The printing machine of claim 9, wherein the change in printing condition is limited to any one of: a transition between two multi-page document copies within the print job, and an insertion activity of a collator.

14. The printing machine of claim 9, wherein the change in printing condition is limited to completion of a quality control operation within the printing machine, the quality control operation being any one of: a print stabilization operation, a color validation operation, and a color calibration operation.

15. The printing machine of claim 10, wherein:
the tray selection process further comprises checking for a third condition in which the present tray contains a number of sheets below a second lower limit,
the sheet for printing is obtained from the other tray when (a) any of one or both of the first and second conditions are not satisfied and, concurrently (b) the third condition is satisfied, and
the sheet for printing is obtained from the present tray when (a) any of one or both of the first and second conditions are not satisfied and, concurrently (b) the third condition is not satisfied.

16. The printing machine of claim 15, wherein:
the tray selection process further comprises checking for a fourth condition corresponding to a change in printing condition occurring in the printing machine unrelated to the number of number of sheets contained in the present tray,
the sheet for printing is obtained from the other tray when (a) any of one or both of the first and second conditions are not satisfied, concurrently (b) the third condition is satisfied, and concurrently (c) the fourth condition is satisfied,
the sheet for printing is obtained from the present tray when (a) any of one or both of the first and second conditions are not satisfied, concurrently (b) the third condition is satisfied, and concurrently (c) the fourth condition is not satisfied.

17. A non-transitory computer readable medium having a program stored therein for controlling a printing machine, the program causing a printer processor of the printing machine to execute a process for printing, the process for printing comprising:
receiving a print job; and
printing a page of the print job,
wherein the printing includes performing a tray selection process for selecting a tray among a plurality of trays from which paper will be obtained for printing the page of the print job, the plurality of trays comprises a present tray and a higher ranked tray ranked higher than the present tray, and the tray selection process comprises:
checking for a first condition in which the higher ranked tray contains a number of sheets above a first lower limit,
checking for a second condition corresponding to a change in printing condition occurring in the printing machine unrelated to the number of sheets contained in the higher ranked tray, and
obtaining a sheet for printing the page, the sheet obtained from the higher ranked tray when the first and second conditions are satisfied, the sheet obtained from the present tray or other tray when any one or both of the first and second conditions are not satisfied, the other tray being among the plurality of trays and being ranked lower than the present tray, wherein the process for printing further comprises printing additional pages of the print job, wherein the printing of each additional page comprises performing the tray selection process for the additional page, wherein the change in printing condition is selected from the group consisting of: a change in paper type, a transition between printing requirements defined in the print job, a changeover between first side printing and second side printing during group-wise duplex printing, a transition between two multi-page document copies within the print job, an insertion activity of a collator, and completion of a quality control operation within the printing machine.

18. The non-transitory computer readable medium of claim 17, wherein ranking of the trays is based on paper throughput, such that a paper throughput for the higher ranked tray is greater than a paper throughput for the present tray.

19. The non-transitory computer readable medium of claim 17, wherein the change in printing condition is limited to any one of: a change in paper type, a transition between printing requirements defined in the print job, and a changeover between first side printing and second side printing during group-wise duplex printing.

20. The non-transitory computer readable medium of claim 17, wherein the change in printing condition is limited to any one of: a transition between two multi-page document copies within the print job, and an insertion activity of a collator.

* * * * *